United States Patent
Wang et al.

(10) Patent No.: US 11,697,349 B2
(45) Date of Patent: **\*Jul. 11, 2023**

(54) POWER ARCHITECTURE FOR A VEHICLE SUCH AS AN OFF-HIGHWAY VEHICLE

(71) Applicant: DANFOSS A/S, Nordborg (DK)

(72) Inventors: Meng Wang, Chanhassen, MN (US);
Jalpa Shah, Woodbury, MN (US);
Damrongrit Piyabongkarn, Plymouth, MN (US)

(73) Assignee: Danfoss A/S, Nordborg (DK)

( * ) Notice: Subject to any disclaimer, the term of this patent is extended or adjusted under 35 U.S.C. 154(b) by 0 days.

This patent is subject to a terminal disclaimer.

(21) Appl. No.: 17/443,776

(22) Filed: Jul. 27, 2021

(65) Prior Publication Data

US 2022/0016986 A1      Jan. 20, 2022

Related U.S. Application Data

(63) Continuation of application No. 16/459,162, filed on Jul. 1, 2019, now Pat. No. 11,104,234.

(60) Provisional application No. 62/697,255, filed on Jul. 12, 2018.

(51) Int. Cl.
| | | |
|---|---|---|
| *B60L 50/10* | (2019.01) | |
| *B60L 50/60* | (2019.01) | |
| *B60L 15/04* | (2006.01) | |
| *B60R 16/033* | (2006.01) | |
| *H02P 27/06* | (2006.01) | |

(52) U.S. Cl.
CPC .............. *B60L 50/10* (2019.02); *B60L 15/04* (2013.01); *B60L 50/60* (2019.02); *B60R 16/033* (2013.01); *H02P 27/06* (2013.01); *B60L 2200/00* (2013.01); *B60L 2210/10* (2013.01)

(58) Field of Classification Search
CPC .......... B60L 10/10; B60L 10/60; B60L 15/04; B60L 2200/00; B60L 2210/10; B60L 50/10; B60L 50/60; B60R 16/03; B60R 16/033; H02P 27/06
USPC .................................................. 307/9.1, 10.1
See application file for complete search history.

(56) References Cited

U.S. PATENT DOCUMENTS

| | | |
|---|---|---|
| 5,020,618 A | 6/1991 | Nagao |
| 5,329,766 A | 7/1994 | Yamaguchi et al. |
| 6,739,127 B2 | 5/2004 | Nippert et al. |
| 8,186,154 B2 | 5/2012 | Nelson et al. |
| 8,479,604 B2 | 7/2013 | Jackson |

(Continued)

FOREIGN PATENT DOCUMENTS

| | | |
|---|---|---|
| EP | 2660395 A1 | 11/2013 |
| JP | 2005076781 A | 3/2005 |

(Continued)

OTHER PUBLICATIONS

Extended European Search Report for Application No. 19185886.9 dated Sep. 30, 2019.

(Continued)

*Primary Examiner* — Hal Kaplan
(74) *Attorney, Agent, or Firm* — Merchant & Gould P.C.

(57) ABSTRACT

The present disclosure relates to a power distribution architecture for an off-road vehicle. The power distribution architecture includes a work circuit and a propel circuit and is configured for facilitating bi-directional power exchange between the work circuit and the propel circuit.

13 Claims, 5 Drawing Sheets

(56) References Cited

U.S. PATENT DOCUMENTS

| | | |
|---|---|---|
| 9,765,501 B2 | 9/2017 | Wang et al. |
| 10,100,827 B2 | 10/2018 | Devan et al. |
| 10,273,657 B2 | 4/2019 | Quan et al. |
| 11,104,234 B2 * | 8/2021 | Wang .................... B60R 16/033 |
| 2005/0246082 A1 | 11/2005 | Miki et al. |
| 2006/0061213 A1 | 3/2006 | Michalko |
| 2007/0166168 A1 | 7/2007 | Vigholm et al. |
| 2007/0227801 A1 | 10/2007 | Loeffler |
| 2011/0056194 A1 | 3/2011 | Wojcicki et al. |
| 2016/0333903 A1 | 11/2016 | Peterson et al. |
| 2017/0121942 A1 | 5/2017 | Danzl et al. |
| 2018/0128292 A1 | 5/2018 | Wang et al. |
| 2019/0199098 A1 | 6/2019 | Shah et al. |
| 2019/0296541 A1 | 9/2019 | Mensch et al. |
| 2020/0018328 A1 | 1/2020 | Wang et al. |

FOREIGN PATENT DOCUMENTS

| | | |
|---|---|---|
| JP | 2006258368 A | 9/2006 |
| WO | 2018/028944 A1 | 2/2018 |

OTHER PUBLICATIONS

Extended European Search Report for Application No. 19185616.0 dated Dec. 16, 2019.

* cited by examiner

POWER ARCHITECTURE FOR A VEHICLE SUCH AS AN OFF-HIGHWAY VEHICLE

CROSS REFERENCE TO RELATED APPLICATION

This application is a continuation of U.S. patent application Ser. No. 16/459,162, filed Jul. 1, 2019, now U.S. Pat. No. 11,104,234; which claims the benefit of U.S. Provisional Patent Application No. 62/697,255, filed Jul. 12, 2018, which applications are hereby incorporated by reference in their entireties.

TECHNICAL FIELD

The present disclosure relates generally to power architectures for vehicles. More particularly, the present disclosure relates to power architectures that distribute power electrically, hydraulically, and mechanically.

BACKGROUND

In a typical off-highway (i.e., off-road) vehicle, the engine of the vehicle generally powers both the propel circuit, which conventionally includes a hydraulic or mechanical transmission, and the work circuit, which is conventionally hydraulically powered. Electric hybrid off-road vehicles have been developed, but improvements are needed in this area.

SUMMARY

Aspects of the present disclosure relate to power architectures suitable for use in vehicles such as off-road vehicles. In certain examples, the power architectures include integrated hybrid and electrical power architectures. In certain examples, the power architectures can be configured to allow for bi-directional power exchange optimization between a work circuit and a propel circuit of a vehicle such as an off-road vehicle. In certain examples, the power architectures can allow for optimized power exchange between the work circuit and the propel circuit thereby allowing recaptured energy to be more effectively utilized while also allowing batteries for storing energy to be downsized by optimizing the real-time use of recovered energy. Certain aspects of power architectures in accordance with the principles of the present disclosure allow electric motors to be downsized by using power architectures where power is derived both hydraulically (e.g., from a common pressure rail) and electrically (e.g., from a common electric bus). Certain aspects of the present disclosure relate to architectures which hybridize both the work circuit and the propel circuit to enhance efficiency thereby reducing energy consumption and providing fuel savings.

A variety of additional inventive aspects will be set forth in the description that follows. The inventive aspects can relate to individual features and to combinations of features. It is to be understood that both the forging general description and the following detail description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
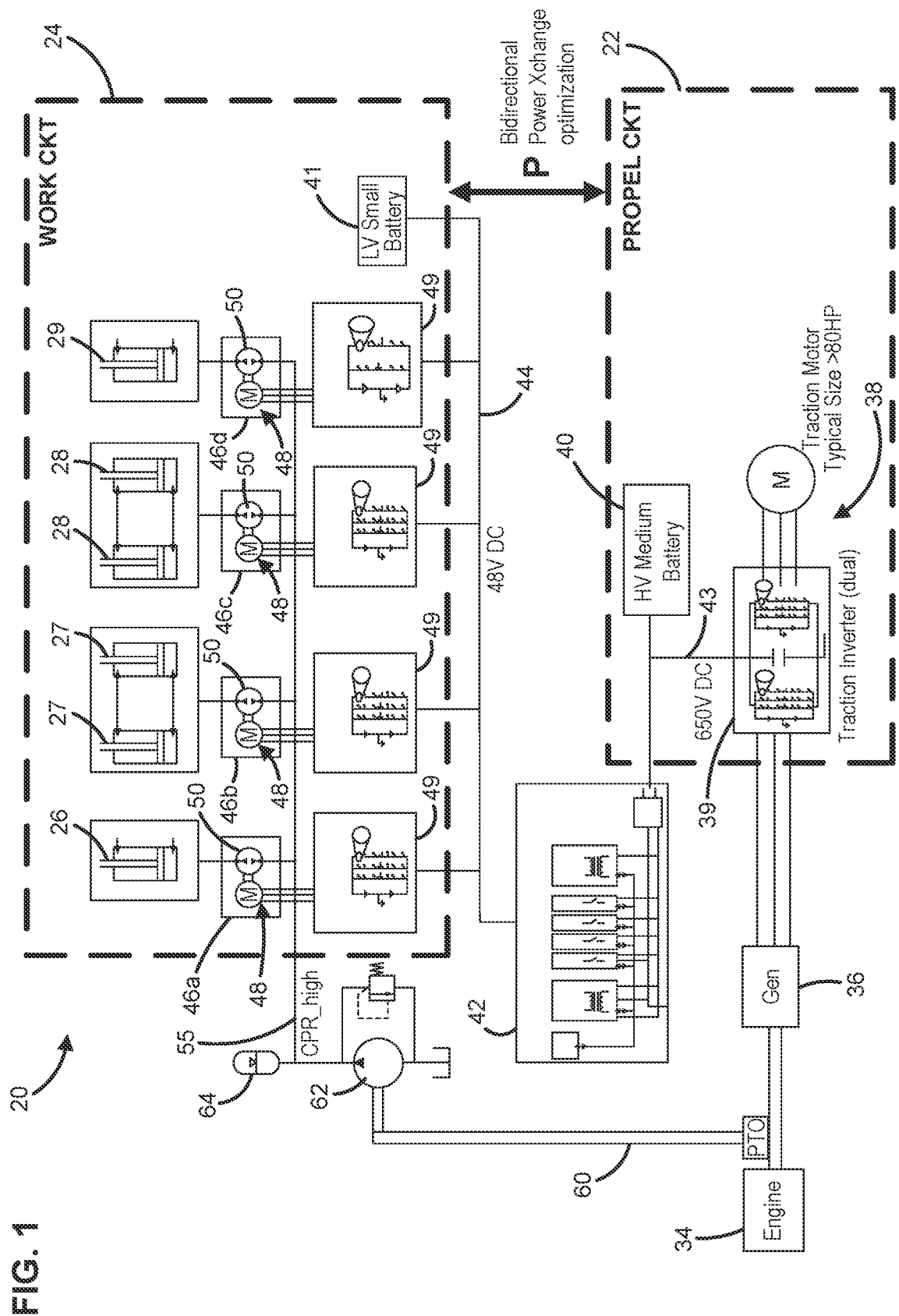
FIG. 1 shows a first power distribution architecture in accordance with the principles of the present disclosure for powering a propel circuit and a work circuit of a vehicle such as an off-road vehicle.

FIG. 1 illustrates a first power distribution architecture 20 in accordance with the principles of the present disclosure for distributing, managing, optimizing, exchanging and blending power in a vehicle such as an off-road vehicle. The power distribution architecture 20 includes a propel circuit 22 and a work circuit 24. The propel circuit 22 is adapted to power vehicle propulsion elements such as tracks or wheels of a vehicle such as an off-road vehicle. In certain examples, the propel circuit 22 interfaces with a transmission or drivetrain that transfers power to the propulsion elements. The work circuit 24 provides power to various working elements or actuators of the vehicle. Example actuators can include hydraulic cylinders and hydraulic motors. As depicted, the actuators can include an actuator 26 for providing tilt functionality, actuators 27 for providing lift functionality (e.g., lifting of a boom or arm) actuators 28 for steering functionality and an actuator 29 for auxiliary functionality. In certain examples, the work circuit can also power other types of actuators such as hydraulic motors/pumps that may be used to provide other functionality such as swing-drive functionality. It will be appreciated that swing-drive functionality relates to the ability to swing or rotate a cab or operator station of a work vehicle relative to a main chassis of the work vehicle. Typically, the cab or operator station rotates/swings in concert with a work element such as a boom, arm, shovel, lift, blade or the like. Aspects of the present disclosure relate to overlaying (e.g., merging, integrating, combining, etc.) hydraulic and electric power distribution architectures in one circuit so that blended power derived from both a hydraulic power source and an electric power source can be used to drive an active component (e.g., a hydraulic cylinder, a hydraulic pump/motor, an electric motor/generator, etc.) of the vehicle.

Referring still to FIG. 1, the first power distribution architecture 20 includes a prime mover 34 such as an internal combustion engine (e.g., a spark ignition engine or a diesel engine), a fuel cell or the like. In the example of FIG. 1, the prime mover 34 powers an electrical generator 36 for providing electrical power to a propulsion electric motor/generator 38. The electrical generator 36 is electrically connected to a traction inverter 39 of the propulsion electric motor/generator 38. The traction inverter 39 can include dual inverter fed motor drives. In certain examples, the traction inverter 39 can provide alternating current (AC) to direct current (DC) electrical conversion. In the depicted example, the traction inverter 39 provides AC-DC conversion and then DC-AC conversion to drive the motor/generator. The AC-DC conversion enables the inverter to provide a DC voltage output 43, and the DC-AC conversion allows AC to be used to be used to drive the propulsion electric motor/generator 38. The propulsion electric motor/generator 38 can be mechanically coupled to the propulsion system (e.g., drivetrain) of the vehicle. Thus, the propulsion electric motor/generator 38 can be used to drive wheels or tracks of the vehicle. It will be appreciated that the propulsion electric motor/generator 38 can be operated at relatively high voltages (e.g., 650 volts DC).

Referring still to FIG. 1, the DC voltage output 43 of the propulsion electric motor/generator 38 is electrically connected to an electrical power storage device such as a battery 40 and to a power distribution unit 42. The battery 40 is integrated as part of the propel power circuit and preferably is a relatively high voltage battery which operates at a voltage higher than a corresponding battery 41 integrated as part of the work circuit 24. The battery 40 at the propel circuit 22 is preferably larger than the battery 41 at the work circuit 24. The power distribution unit 42 can manage bi-directional power exchange between the propel circuit 22 and the work circuit 24. The power distribution unit 42 can include an on-board battery charger or chargers and can include a voltage converter or converters for providing electrical voltage conversion (e.g., high voltage to low voltage DC-DC voltage conversion). The power distribution unit 42 provides an interface between the propel circuit 22 and the work circuit 24 and is configured such that the work circuit 24 can be operated at a substantially lower voltage than the propel circuit 22 while concurrently facilitating bi-directional electrical power exchange between the work circuit 24 and the propel circuit 22. The propulsion electric motor/generator 38 can output electrical power (e.g., from the traction inverter 39) which can be stored at the battery 40 within the propel circuit 22 or can be directed though the power distribution unit 42 to the work circuit 24 for use in powering the actuators 26-29 or for storage at the battery 41. At least a portion of the energy output from the propulsion electric motor/generator 38 can include recovered/regenerated energy that is recovered from the propel circuit 22 (e.g., energy recovered from braking). The propulsion electric motor/generator 38 can receive electrical power from the battery 40. Additionally, electric power generated at the work circuit 24 or stored at the battery 41 can be routed through the power distribution unit 42 to the propulsion electric motor/generator 38 and/or to the battery 40.

As indicated above, the power distribution unit 42 can be configured to enable optimized power exchange between the propel circuit 22 and the work circuit 24. Diagnostics and predicted optimization can be enabled by the power distribution unit 42. In certain examples, the battery size of batteries within the system can be reduced due to the real time power transfer enabled by the power distribution unit 42 between the work circuit 24 and the propel circuit 22. As indicated above, the power distribution unit 42 can include voltage conversion circuitry for providing voltage conversion (e.g., a DC-DC voltage conversion) between the work circuit 24 and the propel circuit 22. Typically, the voltage is converted bi-directionally between the work circuit 24 and the propel circuit 22 such that the voltage utilized by the work circuit 24 is substantially lower than the voltage utilized by the propel circuit 22. In the depicted embodiment, the work circuit 24 has a DC electrical bus 44 electrically coupled to the power distribution unit 42 for transferring electrical power to and from the various electrical components of the work circuit 24, for exchanging electrical power between the various electrical components of the work circuit 24, and for transferring electrical power between the various electrical components of the work circuit 24 and the power distribution unit 42. In one example, the DC electrical bus 44 can optionally have a voltage of 48 volts, and the propel circuit 22 is optionally operated at 650 volts DC.

The DC electrical bus 44 provides electrical power to separate dual power electro-hydraulic motion control units 46a-46d respectively hydraulically coupled to each of the actuators 26-29. Thus, the DC electrical bus 44 is an electrical power source for each of the dual power electro-hydraulic motion control units 46a-46d. Each of the dual power electro-hydraulic motion control units 46a-46d can include an electric motor/generator 48 electrically coupled to the DC electrical bus 44. Each of the electric motor/generators 48 can include a motor drive 49 which may include a DC-DC integrated motor drive converter or an AC-DC integrated motor drive converter. Each of the dual power electro-hydraulic motor control units 46a-46d can also include a hydraulic motor/pump 50 mechanically coupled to the electric motor/generator 48 (e.g., by a drive shaft). The dual power electro-hydraulic motion control units 46a-46d can preferably be configured for receiving both electrical power (e.g., from the DC electrical bus 44) and hydraulic power (e.g., from a common pressure rail 55), and can each be configured to produce a blended power output derived from the electrical and hydraulic power which can be used to power the actuators 26-29.

The dual power electro-hydraulic motion control units 46a-46d can also be configured direct power recovered from the actuators 26-29 during over-running conditions to the DC electric bus 44 and/or the common pressure rail 55. In certain examples, the electro-hydraulic motion control units 46a-46d can be configured to convert hydraulic power from the common pressure rail 55 into electrical power which is directed to the DC electrical bus 44. Electrical power transferred from the electro-hydraulic motion control units 46a-46d to the DC electrical bus 44 can be used in real-time power sharing with the other electro-hydraulic motion control units 46a-46d, and/or can be stored at the battery 41, and/or can be directed through the power distribution unit 42 for use at the propel circuit 22. Further details about example dual power electro-hydraulic motion control units suitable for use at the work circuit 24 to drive actuators are disclosed by U.S. Provisional Patent Application Ser. No. 62/697,226 filed Jul. 12, 2018 is entitled Dual Power Electro-Hydraulic Motion Control System.

Referring still to FIG. 1, the first power distribution architecture 20 utilizes a power take-off 60 to mechanically transfer mechanical energy from the prime mover 34 to a hydraulic pump 62 used to pressurize the common pressure rail 55. An accumulator 64 for storing recovered energy and other energy is also hydraulically connected to the common pressure rail 55. The separate battery 41, which is preferably smaller than the battery 40 at the propel circuit 22, is preferably electrically connected to the DC electrical bus 44 and configured for storing electrical energy recovered by the dual power electro-hydraulic motion control units 46a-46d. The common pressure rail 55 serves as a hydraulic power source for each of the dual power electro-hydraulic motion control units 46a-46d. As depicted, the common pressure rail 55 is fluidly connected to ports of the hydraulic pumps/motors 50 of the dual power electro-hydraulic motion control units 46a-46d.

Figure 2:
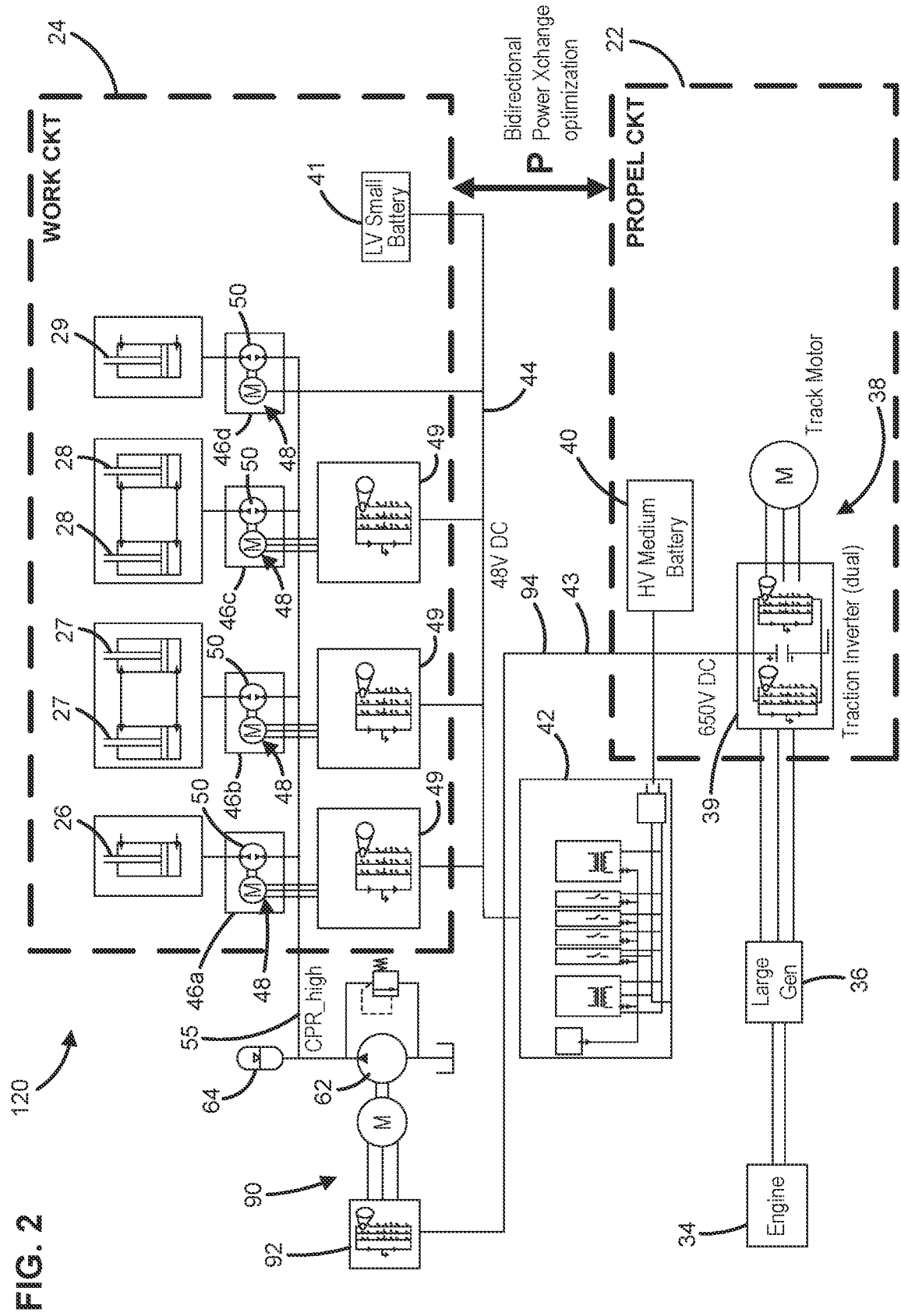
FIG. 2 illustrates a second power distribution architecture in accordance with the principles of the present disclosure for powering a propel circuit and a work circuit of a vehicle such as an off-road vehicle.

FIG. 2 illustrates a second power distribution architecture 120 in accordance with the principles of the present disclosure for distributing, managing, optimizing, exchanging and blending power in a vehicle such as an off-road vehicle. The second power distribution architecture 120 has the same configuration as the first power distribution architecture 20 except the power take-off 60 for driving the hydraulic pump 62 has been replaced with an electric motor/generator 90. The electric motor/generator 90 is electrically powered by the DC voltage output 43 from the traction inverter 39. In certain examples, the electric motor/generator 90 can include a motor drive 92 that provides DC-AC conversion. An electrical line 94 allows electrical power to be transferred bi-directionally between the electric motor/generator 90 and the propel circuit 22. The electrical line 94 can be electrically connected to the battery 40, the power distribution unit 42 and the traction inverter 39. Other than the addition of the electrical line 94, power sharing and management between the work circuit 24 and the propel circuit 22 can operate in the same way described with respect to the first power distribution architecture 20 of FIG. 1. In certain examples, the electrical generator 36 of the second power distribution architecture 120 is larger than the electrical generator 36 of the first power distribution architecture 20 since the electrical generator 36 of the second power distribution architecture 120 provides full power for both the propel circuit 22 and the work circuit 24.

Figure 3:
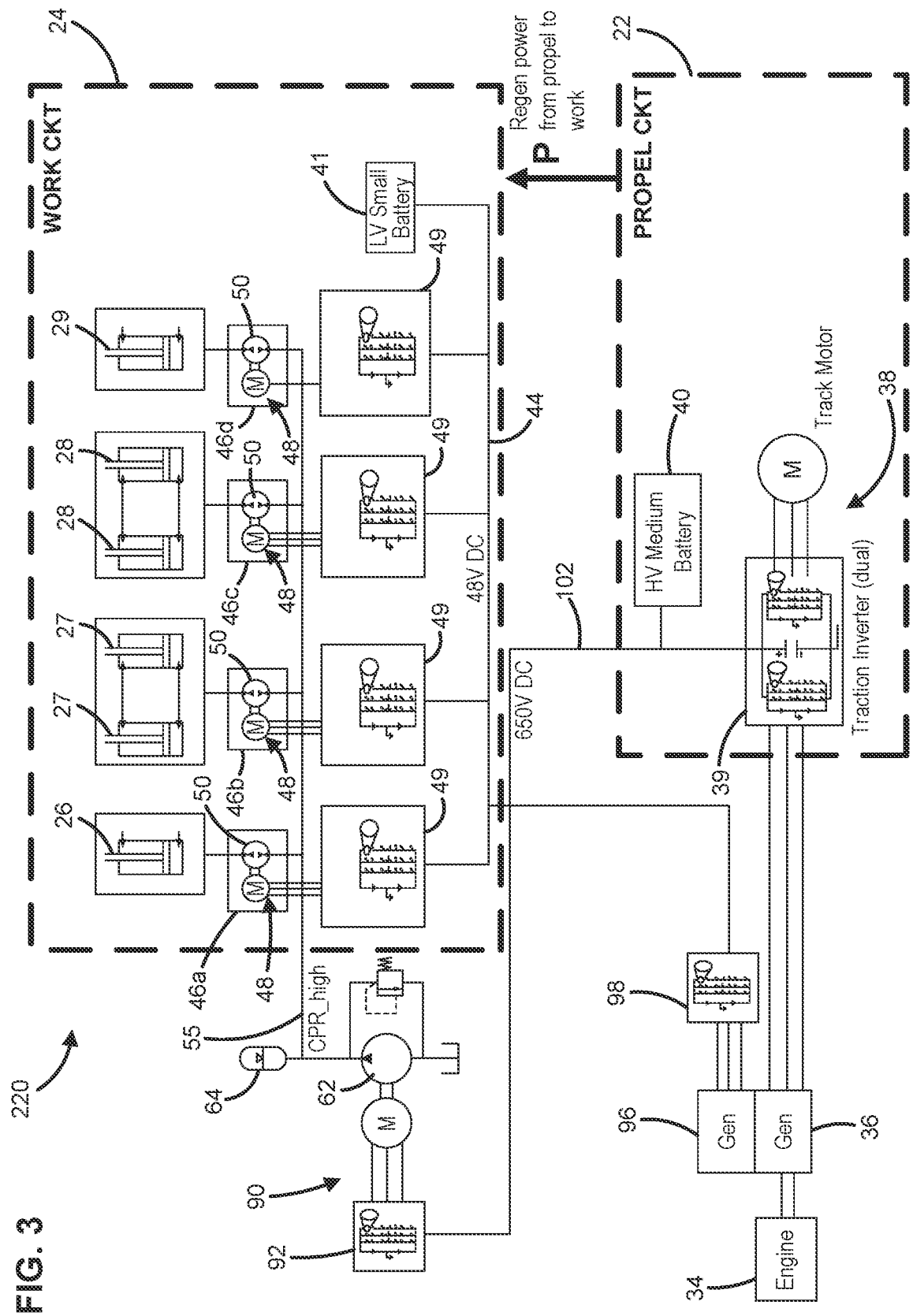
FIG. 3 shows a third power distribution architecture in accordance with the principles of the present disclosure for powering a propel circuit and a work circuit of a vehicle such as an off-road vehicle.

FIG. 3 shows a third power distribution architecture 220 in accordance with the principles of the present disclosure for distributing, managing, optimizing, exchanging and blending power in a vehicle such as an off-road vehicle. It will be appreciated that the third power distribution architecture 220 has the same configuration as the second power distribution architecture 120 except the power distribution unit 42 has been eliminated. Instead, the third power distribution architecture 220 includes an additional electric generator 96 powered by the prime mover 34. The electric generator 96 provides electrical power to the DC electrical bus 44 corresponding to the work circuit 24. As depicted, the electrical generator 96 provides electrical power to power electronics 98 such that an AC-DC converter that converts an AC input from the electric generator 96 to a DC output provided to the DC electrical bus 44. Preferably, the DC output provided to the DC electrical bus 44 is substantially less than the DC output provided by the traction inverter 39. In the example third power distribution architecture 220 of FIG. 3, the DC electrical bus 44 is separate or isolated from an electrical bus 102 connected to the traction inverter 39. The electrical bus 102 is energized by the propulsion electric motor/generator 38 (e.g., from the traction inverter 39) and is electrically connected to the battery 40 and the motor drive 92 of the electric motor/generator 90. Thus, the third power distribution architecture 220 of FIG. 3 utilizes separate electrical buses, while the power architectures of FIGS. 1 and 2 use an electrical arrangement in which the buses are integrated or coupled together through the power distribution unit 42.

Figure 4:
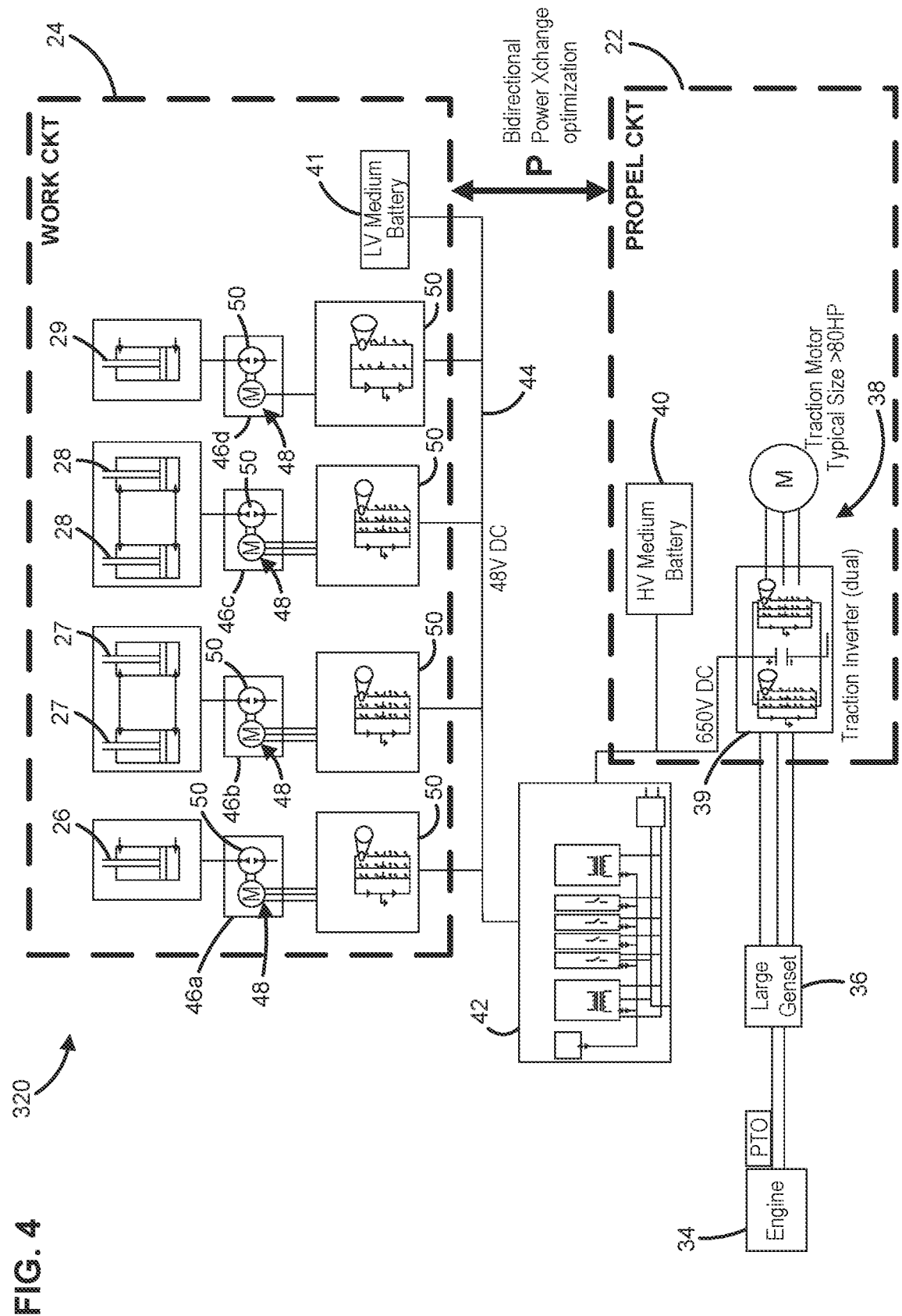
FIG. 4 shows a fourth power distribution architecture in accordance with the principles of the present disclosure for powering a propel circuit and a work circuit of a vehicle such as an off-road vehicle.

FIG. 4 shows a fourth power distribution architecture 320 in accordance with the principles of the present disclosure for distributing, managing, optimizing and exchanging power in a vehicle such as an off-road vehicle. The fourth power distribution architecture 320 has the same configuration as the second power distribution architecture 120 of FIG. 2 except the common pressure rail 55, the hydraulic pump 62 and the electric motor/generator 90 have been eliminated. Thus, the fourth power distribution architecture 320 does not utilize blended hydraulic and electrical power at the work circuit 24. It will be appreciated that both the propel circuit 22 and the work circuit 24 are electrified. The power distribution unit 42 enables the optimized power exchange between the work circuit 24 and the propel circuit 22. The power exchange between the work circuit 24 and the propel circuit 22 is electrical. At the work circuit 24, the DC electrical bus 44 powers the electrical motors/generators 48 which drive the hydraulic pumps/motors 50 used to provide hydraulic power to the actuators 26-29. Thus, in the fourth power distribution architecture 320 of FIG. 4, the electro-hydraulic motion control units 46a-46d are not dual power, but instead only receive electrical power which is converted to hydraulic power provided at the actuators 26-29. Because the common pressure rail 55 is not used to assist in power exchange between the various components of the working circuit 24, the low voltage battery 41 coupled to the electric bus 44 of the fourth distribution architecture 320 is preferably larger than the low voltage batteries 41 used in the power distribution architectures 20, 120, 220 of FIGS. 1-3. It will be appreciated that by eliminating the hydraulic pump 62, pump losses and/or metering losses can be eliminated from the work circuit 24. It will be appreciated that bi-directional power exchange between the work circuit 24 and the propel circuit 22 can operate in the same way described with respect to the bi-directional electrical power exchange of the first power distribution architecture 20 of FIG. 1.

Figure 5:
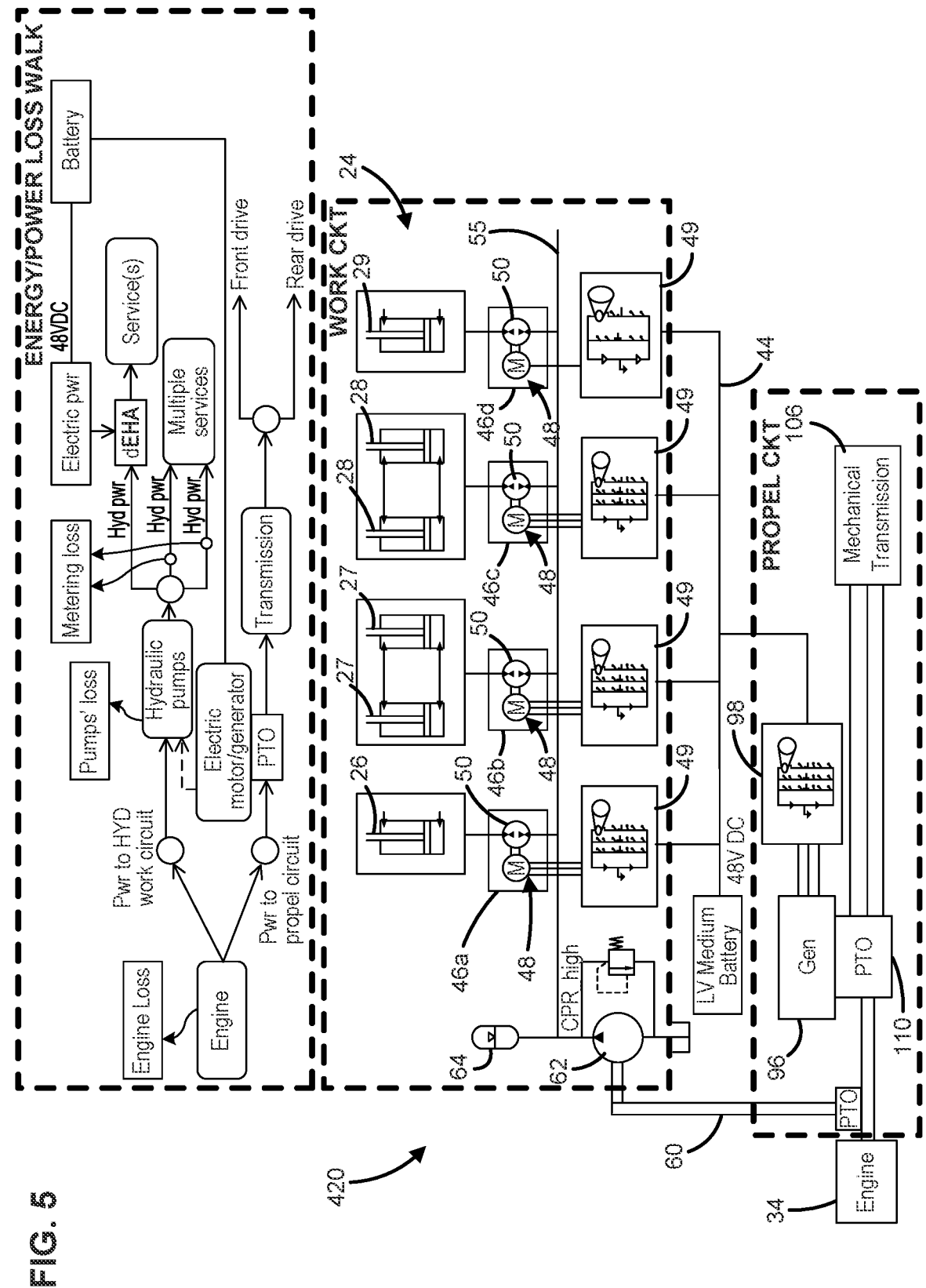
FIG. 5 depicts a fifth power distribution architecture in accordance with the principles of the present disclosure for powering a propel circuit and a work circuit of a vehicle such as an off-road vehicle.

FIG. 5 illustrates a fifth power distribution architecture 420 in accordance with the principles of the present disclosure for distributing, managing, optimizing, exchanging and blending power in a vehicle such as an off-road vehicle. It will be appreciated that the fifth power distribution architecture 420 has the same basic configuration as the first power distribution architecture 20 of FIG. 1 except propulsion of the vehicle is provided by a mechanical transmission 106 which mechanically extracts energy from the prime mover 34 by a power take-off 110. Additionally, the prime mover 34 powers the DC electrical bus 44 of the work circuit 24 in the same manner described with respect to the third power distribution architecture 220 of FIG. 3. In the fifth power distribution architecture 420, only one electrical bus (e.g., the DC electrical bus 44 for energizing the work circuit 24) is utilized and power for driving propulsion of the vehicle as well as for driving the hydraulic pump 62 for pressurizing the common pressure rail 55 is provided mechanically (e.g., via belts, gears, transmissions, sprockets, chains, clutches or the like). By using the electric motors/generators 48 to more precisely control the hydraulic power provided to the actuators 26-29, throttling losses can be reduced or eliminated. Additionally, by powering the dual power electro-hydraulic motor control units 46a-46d with both the common pressure rail 55 and the DC electrical bus 44 as shown at FIG. 5, service power from the actuators 26-29 can be readily regenerated in the work circuit 24. Additionally, braking energy from the propel circuit 22 can be re-routed to the work circuit 24. For example, mechanical energy from braking can be used to drive the generator which directs electrical power to the DC electrical bus 44. In this way, engine power management can be enabled.

What is claimed is:
1. A power distribution architecture for an off-road vehicle, the power distribution architecture comprising:
    a work circuit including a plurality of motion control units configured to be fluidly connected to separate hydraulic actuators, the motion control units each including an electric motor/generator mechanically coupled to a pump/motor;

an electrical bus for providing electrical power to each of the electric motors/generators;

a common pressure rail for providing hydraulic power to each of the motion control units; and a prime mover which directs power through a power take-off to a mechanical transmission for driving propulsion of the vehicle, wherein the prime mover also is coupled to a mechanical power take-off to a pump for pressurizing the common pressure rail.

2. The power distribution architecture of claim 1, further comprising a hydraulic accumulator in fluid communication with the common pressure rail.

3. The power distribution architecture of claim 1, further comprising a first battery corresponding to the work circuit that is electrically connected to the electrical bus.

4. The power distribution architecture of claim 1, wherein the electrical bus is a DC electrical bus.

5. The power distribution architecture of claim 1, wherein the mechanical power take-off transfers power from the prime mover to the electric motor/generator, and wherein the mechanical power take-off and the electric generator allow braking energy to be re-routed to the work circuit.

6. The power distribution architecture of claim 1, wherein the prime mover drives the electric motor/generator for energizing the electrical bus.

7. A power distribution architecture for an off-road vehicle, the power distribution architecture comprising:

a work circuit including a plurality of motion control units configured to be fluidly connected to separate hydraulic actuators, the motion control units each including an electric motor/generator mechanically coupled to a pump/motor;

an electrical bus for providing electrical power to each of the electric motors/generators;

a common pressure rail for providing hydraulic power to each of the motion control units; and a prime mover which drives an electric generator for providing electrical power to a motor drive of an electric traction motor of a propel circuit of the vehicle, wherein the prime mover also is coupled by a mechanical power take-off to a pump for pressurizing the common pressure rail, wherein the motor drive is configured to direct a DC output along a DC power line to a power distribution unit, wherein the power distribution unit electrically connects the DC power line to the electrical bus and provides DC-DC power conversion such that the DC electrical bus has a lower DC voltage than the DC power line, and wherein the power distribution unit allows for bi-directional electrical power transfer between the DC power line and the DC electrical bus.

8. The power distribution architecture of claim 7, further comprising:

a first battery corresponding to the work circuit that is electrically connected to the electrical bus; and a second battery coupled to the DC power line, the second battery having a higher voltage than the first battery.

9. A power distribution architecture for an off-road vehicle, the power distribution architecture comprising:

a work circuit including a plurality of motion control units configured to be fluidly connected to separate hydraulic actuators, the motion control units each including an electric motor/generator mechanically coupled to a pump/motor;

an electrical bus for providing electrical power to each of the electric motors/generators;

a common pressure rail for providing hydraulic power to each of the motion control units; and a prime mover which drives an electric generator for providing electrical power to a motor drive of an electric traction motor of a propel circuit of the vehicle, wherein the motor drive is configured to direct a DC output along a DC power line to a power distribution unit, wherein the power distribution unit electrically connects the DC power line to the electrical bus and provides DC-DC power conversion such that the electrical bus has a lower DC voltage than the DC power line, wherein the power distribution unit allows for bi-directional electrical power transfer between the DC power line and the DC electrical bus, and wherein the DC power line powers an electric pump/motor for pressurizing the common pressure rail.

10. The power distribution architecture of claim 9, further comprising:

a first battery corresponding to the work circuit that is electrically connected to the electrical bus; and a second battery coupled to the DC power line, the second battery having a higher voltage than the first battery.

11. A power distribution architecture for an off-road vehicle, the power distribution architecture comprising:

a work circuit including a plurality of motion control units configured to be fluidly connected to separate hydraulic actuators, the motion control units each including an electric motor/generator mechanically coupled to a pump/motor;

an electrical bus for providing electrical power to each of the electric motors/generators;

a common pressure rail for providing hydraulic power to each of the motion control units;

a first battery corresponding to the work circuit that is electrically connected to the electrical bus; and a prime mover which drives a first electric generator for providing electrical power to a motor drive of an electric traction motor of a propel circuit of the vehicle, wherein the motor drive is configured to direct a DC output along a DC power line, wherein the DC power line powers an electric pump/motor for pressurizing the common pressure rail.

12. The power distribution architecture of claim 11, further comprising a second battery coupled to the DC power line, the second battery having a higher voltage than the first battery.

13. The power distribution architecture of claim 11, wherein the prime mover drives a second electric generator that energizes the electrical bus, and wherein the electrical bus has a DC voltage that is lower than a DC voltage of the DC power line.

* * * * *